US008730502B2

(12) United States Patent
Burke, Jr.

(10) Patent No.: US 8,730,502 B2
(45) Date of Patent: May 20, 2014

(54) METHOD AND SYSTEM FOR MANAGING PRINT JOBS USING A CLOUD ADMINISTRATION SYSTEM

(75) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 147 days.

(21) Appl. No.: 13/112,245

(22) Filed: May 20, 2011

(65) Prior Publication Data
US 2012/0293827 A1 Nov. 22, 2012

(51) Int. Cl.
*G06K 15/00* (2006.01)

(52) U.S. Cl.
USPC .......................................................... 358/1.15

(58) Field of Classification Search
USPC .......................................................... 358/1.15
See application file for complete search history.

(56) References Cited

U.S. PATENT DOCUMENTS

| | | | |
|---|---|---|---|
| 5,128,878 A * | 7/1992 | Gore et al. ..................... | 345/502 |
| 5,305,199 A | 4/1994 | LoBiondo et al. | |
| 6,304,732 B1 | 10/2001 | Myers et al. | |
| 6,647,222 B1 | 11/2003 | Digby et al. | |
| 7,317,882 B2 | 1/2008 | Dombrowski | |
| 7,574,496 B2 | 8/2009 | McCrory et al. | |
| 7,587,146 B2 | 9/2009 | Horn | |
| 7,649,638 B2 | 1/2010 | Beard et al. | |
| 7,650,085 B2 | 1/2010 | Kehoe et al. | |
| 7,667,874 B2 | 2/2010 | MacDonald et al. | |
| 7,773,239 B2 | 8/2010 | Beard et al. | |
| 8,009,302 B2 | 8/2011 | Martin | |
| 8,139,238 B2 | 3/2012 | Oki | |
| 2003/0053118 A1* | 3/2003 | Muramoto et al. .......... | 358/1.15 |
| 2006/0139687 A1* | 6/2006 | Ohara et al. ................. | 358/1.15 |
| 2008/0055621 A1* | 3/2008 | Price et al. .................... | 358/1.13 |
| 2008/0130051 A1* | 6/2008 | Lawrence et al. ............ | 358/1.15 |
| 2010/0103445 A1 | 4/2010 | Levine et al. | |
| 2010/0302579 A1* | 12/2010 | Nuggehalli et al. ......... | 358/1.15 |
| 2010/0332629 A1 | 12/2010 | Cotugno et al. | |
| 2011/0047204 A1 | 2/2011 | Mansoor et al. | |
| 2011/0228351 A1* | 9/2011 | Uchida et al. ................. | 358/474 |
| 2011/0292431 A1 | 12/2011 | Cok | |
| 2011/0292435 A1 | 12/2011 | Cok et al. | |
| 2012/0293826 A1 | 11/2012 | Saurabh | |

OTHER PUBLICATIONS

B. Pellow, "Moving to the Cloud", Business Development Services Analysis, Nov. 2010, InfoTrends 2010, pp. 1-7.
A. Wawro, "Cloud Printers Rain on Security Parade", PC World, Apr. 2011, vol. 29, No. 4, p. 36.

* cited by examiner

*Primary Examiner* — Qian Yang
(74) *Attorney, Agent, or Firm* — Fox Rothschild LLP (57) ABSTRACT

A cloud administration system for managing print jobs may include a submission module, a processing module in communication with the submission module and a plurality of print devices, and one or more storage modules in communication with the processing module. The processing module may be located remotely from the plurality of print devices. The submission module may be configured to receive a print job from a source computing device. The source computing device may be located remotely from the submission module. The processing module may be configured to receive the print job from the submission module, store the print job in at least one of the storage modules, and transmit the print job to at least one of the plurality of print devices. The cloud administration system may operate as a shared resource for each of the plurality of print devices and the source computing device.

20 Claims, 6 Drawing Sheets

METHOD AND SYSTEM FOR MANAGING PRINT JOBS USING A CLOUD ADMINISTRATION SYSTEM

B. CROSS-REFERENCE TO RELATED APPLICATIONS

This application is related to U.S. Pat. No. 8,593,676 entitled "Method And System For Managing Print Device Information Using A Cloud Administration System", U.S. Pat. No. 8,505,004 entitled "Methods And Systems For Providing Software Updates Using A Cloud Administration System", U.S. Pat. No. 8,537,398 entitled "Methods And Systems For Tracking And Managing Print Device Inventory Information Using A Cloud Administration System", U.S. Pat. No. 8,630,008 entitled "Method And System For Managing Print Device Information Using A Cloud Administration System", and United States Patent Application Publication Number 2012/0293831 entitled "Methods And Systems For Managing Print Device Licenses Using A Cloud Administration System", each filed on May 20, 2011.

C.-E. Not Applicable

F. BACKGROUND

Typically, print-related services and solutions require providing onsite resources to a customer, such as software, hardware and personnel. In addition, numerous print-related services and solutions may operate autonomously, even though they utilize similar delivery mechanisms and backend connectivity. As such, providing print-related services can often be costly and inefficient.

G. SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a cloud administration system for managing print jobs may include a submission module, a processing module in communication with the submission module and a plurality of print devices, and one or more storage modules in communication with the processing module. The processing module may be located remotely from the plurality of print devices. The submission module may be configured to receive a print job from a source computing device. The source computing device may be located remotely from the submission module. The processing module may be configured to receive the print job from the submission module, store the print job in at least one of the storage modules, and transmit the print job to at least one of the plurality of print devices. The cloud administration system may operate as a shared resource for each of the plurality of print devices and the source computing device.

In an embodiment, a cloud administration system for managing print jobs may include a processing module in communication with a plurality of print devices and one or more storage modules in communication with the processing module. The processing module may be located remotely from each of the plurality of print devices. The processing module may be configured to receive a print job from at least one of the plurality of print devices, store the print job in at least one of the one or more storage modules, enable an application computing device to access the print job from the storage module, and transmit the accessed print job. The application computing device may be located remotely from the processing module. The cloud administration system may operate as a shared resource for each of the plurality of print devices.

In an embodiment, a method of processing a print job may include receiving a print job by a cloud administration system from a source computing device located remotely from the cloud administration system, storing the received print job in a computer-readable storage medium associated with the cloud administration system and transmitting the received print job to a print device located remotely from the cloud administration system.

In an embodiment, a method of processing a print job may include receiving a print job by a cloud administration system from a print device located remotely from the cloud administration system, storing the received print job in a computer-readable storage medium associated with the cloud administration system, enabling an application computing device to access the received print job from the computer-readable storage medium, and transmitting the received print job. The application computing device may be located remotely from the cloud administration system.

I. DETAILED DESCRIPTION

The following terms shall have, for the purposes of this application, the respective meanings set forth below.

An "application computing device" is a computing device capable of sending information to and/or receiving information from a cloud administration system.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. An exemplary computing device or processor is described in reference to FIG. 5.

A "firewall" is hardware and/or software used to protect a resource of a network from unauthorized external access.

A "job" refers to a logical unit of work that is to be completed for a customer.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or "print-related function" is a function that is performed on a print job. Exemplary operations may include raster image processing, formatting, stapling, collating, sorting, punching, binding and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "queue" is a data structure stored on a computer-readable medium and configured to temporarily store information, including, but not limited to, a print job, print device information and/or the like.

The term "remote," as used herein with respect to computing devices and/or print devices, refers to devices that operate on different computer networks and/or computer networks operated by different entities. For example, a computing device is remote from a print device if the computing device is connected to a first LAN operated by a first entity and the print device is connected to a second LAN operated by a second entity.

A "resource" is a physical device having a processor and/or a storage medium. Exemplary resources may include a computing device, a processing device a storage device and/or the like.

A "shared resource" is a resource that may be accessed and used by a plurality of other resources.

A "source computing device" is a computing device that is capable of transmitting one or more print jobs to a cloud administration system.

A "storage module" or "SM" is a computer-readable storage medium or portion thereof.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

Figure 1A:
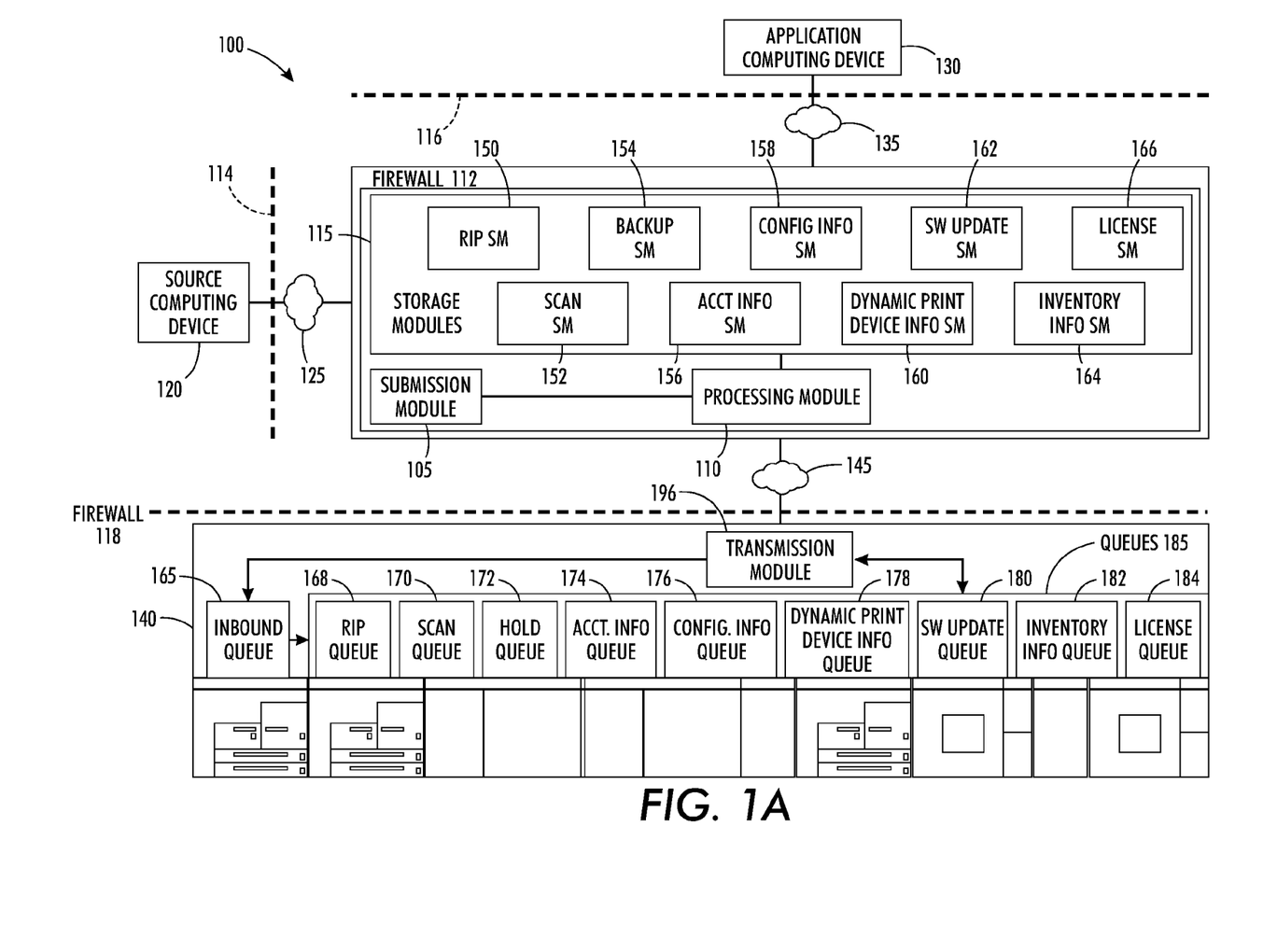
FIGS. 1A and 1B illustrate exemplary cloud administration systems according to an embodiment.

FIG. 1A illustrates an exemplary cloud administration system according to an embodiment. As illustrated by FIG. 1A, a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In an embodiment, a storage module 115 may correspond to an operation or type of operation to be performed on a print job, or it may correspond to the type of information it stores. For example, as illustrated by FIG. 1A, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166 and/or the like. Storage modules 115 are discussed in more detail below.

In an embodiment, a cloud administration system 100 may be in communication with one or more source computing devices 120. A source computing device 120 may be located remotely from the cloud administration system 100. In an embodiment, all source computing devices 120 may be located remotely from the cloud administration system 100. In an embodiment, a source computing device 120 may communicate with a cloud administration system 100 through a plurality of firewalls. For example, a communication from a source computing device 120 to a submission module 105 may pass through a firewall 114 associated with the source computing device and the firewall 112 associated with the cloud administration system 100.

In an embodiment, a source computing device 120 may communicate directly with a cloud administration system 100 over a network 125. In an embodiment, the network 125 may be operated by an entity. An entity may be a corporation, an organization, a group, an individual and/or the like. In an embodiment, a plurality of source computing devices 120 may communicate with the cloud administration system 100 over one or more networks.

In an embodiment, a cloud administration system 100 may be in communication with one or more application computing devices 130. An application computing device 130 may be in communication with the processing module 110 and/or one or more storage modules 115. In an embodiment, an application computing device 130 may communicate with the cloud administration system 100 through a plurality of firewalls. For example, a communication from an application computing device 130 to a processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. In an alternate embodiment, an application computing device 130 may be a component of the cloud administration system 100.

An application computing device 130 may communicate with the cloud administration system 100 over a network 135. In an embodiment, an application computing device 130 may communicate directly with a submission module 105 over a network 135. In an embodiment, an application computing device 130 may communicate with a submission module 105 through one or more firewalls.

An application computing device 130 may be located remotely from a source computing device 120. In an embodiment, each application computing device 130 may be located remotely from each source computing device 120. In an embodiment, the network 135 over which an application computing device 130 may communicate with a cloud administration system 100 may be operated by a different entity than that which operates a network over which a source computing device 120 may communicate with the cloud administration system.

In an embodiment, a cloud administration system 100 may be in communication with one or more print devices 140. A print device 140 may be located remotely from the cloud administration system 100 and may communicate with the cloud administration system over one or more networks 145. In an embodiment, each print device 140 may be located remotely from the cloud administration system 100.

In an embodiment, a print device 140 may communicate with a cloud administration system 100 through a plurality of firewalls. For example, a communication from a print device 140 to a cloud administration system 100 may pass through a firewall 118 associated with the print device and the firewall 112 associated with the cloud administration system 100.

In an embodiment, a print device 140 may be located remotely from a source computing device 120 and an application computing device 130. In an embodiment, each print device 140 may be located remotely from each source computing device 120 and each application computing device 130. In an embodiment, the network 145 over which a print device 140 may communicate with a cloud administration system 100 may be operated by an entity that is different that that which operates a network over which a source computing device 120 may communicate with the cloud administration system and/or a network over which an application computing device 130 may communicate with the cloud administration system.

In an embodiment, a print device 140 may have one or more queues 185 that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165, such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1A, a print device may have a RIP queue 168, a scan queue 170, a hold queue 172, an accounting information queue 174, a configuration information queue 176, a dynamic print device information queue 178, a software update queue 180, an inventory information queue 182, a license queue 184 and/or the like. Queues 185 are discussed in more detail below.

In an embodiment, a print device 140 may have a transmission module 196. A transmission module may be in communication with one or more queues 185. A transmission module 196 may be configured to transmit data from a print device 140 to a computing device, another print device and/or the like. In an embodiment, a transmission module 196 may be in communication with a cloud administration system 100. For example, a transmission module 196 may be in communication with a processing module 110 of a cloud administration system 100.

In an embodiment, a source computing device 120, an application computing device 130 and a print device 140 may not communicate directly with one another. As illustrated by FIG. 1A, the source computing device 120, the application computing device 130 and the print device 140 may communicate indirectly via a cloud administration system 100.

Figure 1B:
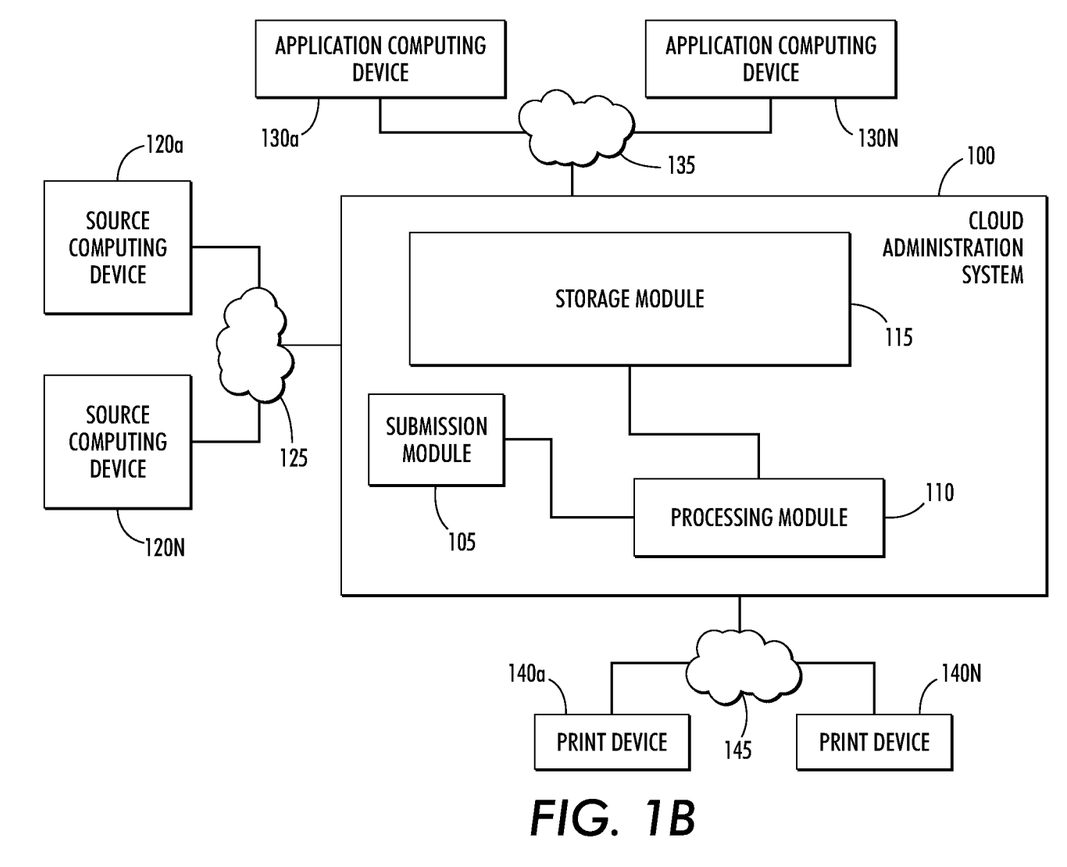

FIG. 1B depicts an exemplary cloud administration system according to an embodiment. As illustrated by FIG. 1B, a cloud administration system 100 may communicate with more than one source computing device 120*a*-N, application computing device 130*a*-N and/or print device 140*a*-N.

Figure 2:
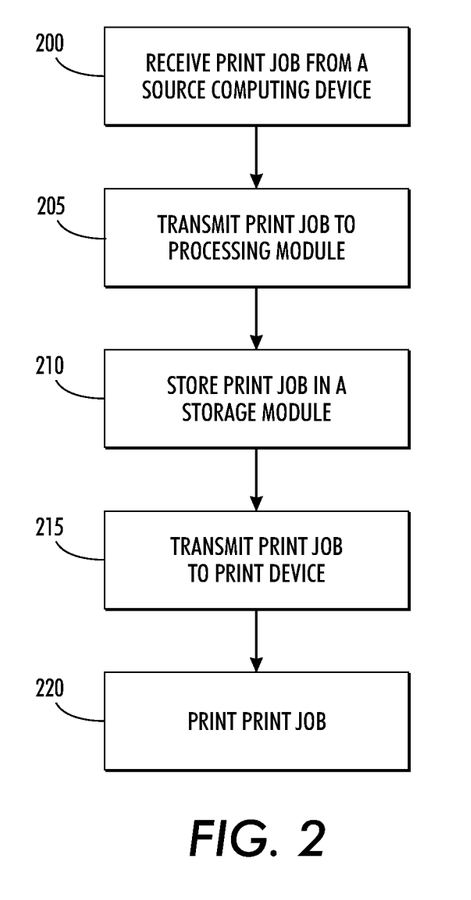
FIGS. 2 and 3 illustrate exemplary methods of processing a print job according to an embodiment.

FIG. 2 illustrates an exemplary method of processing a print job according to an embodiment. As illustrated by FIG. 2, a print job may be received 200 from a source computing device. The print job may be received 200 through a hypertext transfer protocol request, a file transfer protocol transmission, an email and/or the like. In an embodiment, the network over which the source computing device and the cloud system communicate may include a LAN, the Internet and/or the like.

In an embodiment, a print job may be received 200 by a submission module of a cloud administration system. The submission module may transmit 205 the print job to the processing module of the cloud administration system. The processing module may store 210 the print job in a storage module, and may transmit 215 the print job to a print device. In an embodiment, the processing module may transmit 215 the print job to an inbound spooler associated with the print device. The print device may print 220 the print job.

Figure 3:
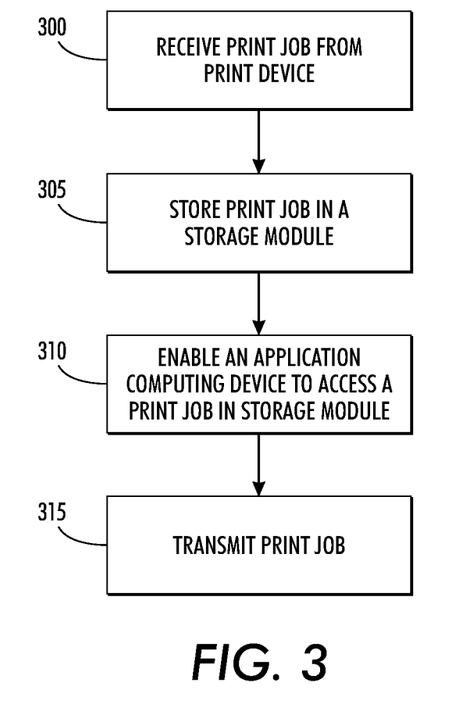

FIG. 3 illustrates an exemplary method of processing a print job according to an embodiment. As illustrated by FIG. 3, a print job may be received 300 from a print device. In an embodiment, a print job may be received 300 from a print device queue. In an embodiment, a print job received 300 from a print device may be processed before it is printed by the print device. In an embodiment, a print job received 300 from a print device may be transmitted to another computing device. For example, a user may scan a document using a print device. The scanned print job may be placed in a queue of the print device, and may be sent from the queue to the cloud administration system.

In an embodiment, the processing module may store 305 the received print job in a storage module of the cloud administration system. In an embodiment, the storage module into which a print job is stored 305 may be associated with the print device queue from which it is received. For example, a print job to be raster image processed may be stored in a raster image processing (RIP) queue associated with a print device. The print job may be received 300 by the cloud administration system, and the processing module may store 305 the print job in a RIP storage module.

In an embodiment, the cloud administration system may enable 310 an application computing device to access a print job from a storage module. In an embodiment, an application computing device may access a print job from a storage module in order to perform one or more operations on the print job. In an alternate embodiment, an application computing device may access a print job from a storage module in order to copy the print job, initiate transmission of the print job and/or otherwise utilize the print job and/or metadata associated with the print job.

For example, as illustrated by FIG. 1A, a cloud administration system may have a RIP storage module. In an embodiment, a cloud administration system may enable 310 an application computing device to access a print job in the RIP storage module. The application computing device may perform one or more RIP operations on the print job in the RIP storage module. Once the processing is completed, the cloud administration system may transmit 315 the print job. In an embodiment, the cloud administration system may transmit 315 the print job to the print device from which it was received. In an alternate embodiment, the cloud administration system may transmit 315 the print job to a different print device than the print device from which it was received. In another embodiment, the cloud administration system may transmit 315 the print job to a computing device. Additional and/or alternate types of cloud administration system storage modules may be used within the scope of this disclosure.

In an embodiment, as illustrated by FIG. 1A, a print device may have a scan queue. Digital representations of documents that are scanned at the print device may be stored in the scan queue. One or more print jobs from the scan queue may be received 300 by the cloud administration system. The cloud administration system may store 305 the print jobs in a scan storage module. The cloud administration system may enable 310 one or more application computing devices to access the print jobs in the scan storage module.

In an embodiment, as illustrated by FIG. 1A, a print device may have a hold queue. The hold queue may include print jobs that are to be printed at a later time. In an embodiment, the print jobs in the hold queue may be received 300 by the cloud administration system and stored in a backup storage module. In an embodiment, the contents of the hold queue may be received 300 by the cloud administration system at certain time intervals, such as every 24 hours. In an alternate embodiment, the contents of the hold queue may be received 300 by the cloud administration server each time a new print job is added to the hold queue.

In an embodiment, the backup storage module may store the print jobs as backup copies should the contents of the hold queue become corrupted or become otherwise inaccessible. If the contents of the hold queue are inaccessible, the cloud administration system may transmit the contents of the backup storage module to the print device.

Figure 4:
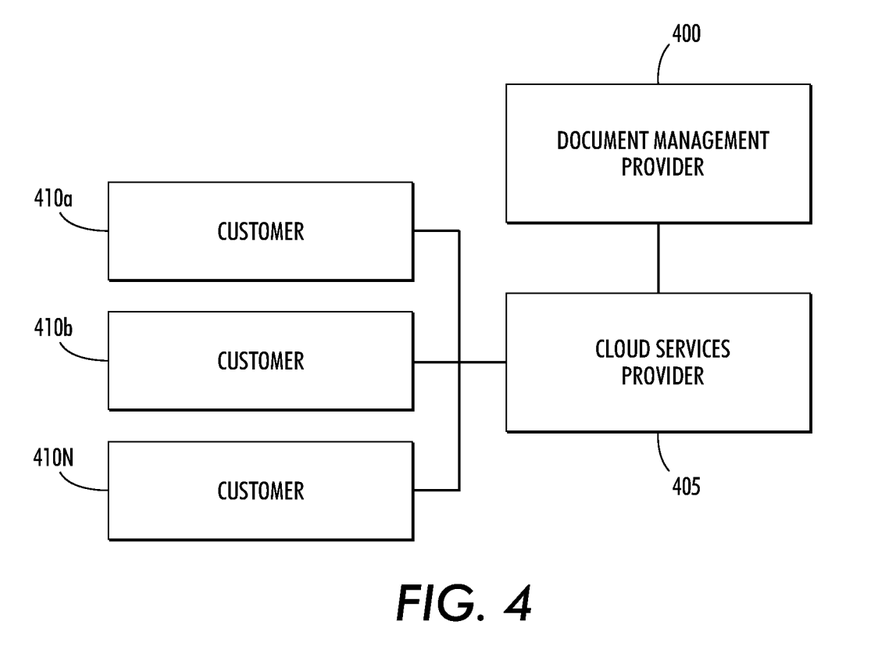
FIG. 4 illustrates an exemplary implementation of a cloud administration system according to an embodiment.

FIG. 4 illustrates an exemplary implementation of a cloud administration system according to an embodiment. A document management provider 400 may contract with a cloud services provider 405 to provide cloud services to the document management provider's customers 410a-N. A document management provider 400 may be an entity that supplies, manages and/or maintains print devices, processes print jobs and/or performs other document management services. A cloud services provider 405 may operate and/or maintain a cloud administration system to provide cloud services. Cloud services may describe applications that may be accessed on demand from a cloud services provider that hosts the applications. Cloud services may include applications for document management, document processing, account management, print device configuration, document retention and backup, and/or the like.

In an embodiment, a computing device operated by a customer 410a-N may communicate directly with a cloud administration system. For example, a print device or source computing device utilized by a customer 410a-N at the customer's location may send one or more print jobs to a cloud administration system operated by a cloud services provider 405. The cloud administration system may store the print jobs. In an embodiment, an application computing device operated by the document management provider 400 or another entity with whom the document management provider has contracted, may access the print jobs from the cloud administration system.

For example, a cloud administration system may store a print job from a customer 410a-N that is to be raster image processed. The document management provider 400 may access the print job via an application computing device from the cloud administrative system in order to raster image process the print job. In an alternate embodiment, a service or other entity with whom the document management provider 400 contracts for raster image processing services, may access the print job via an application computing device from the cloud administrative system in order to raster image process the print job. The cloud administration system may then send the raster image processed print job to a computing device or a print device to be printed.

Figure 5:
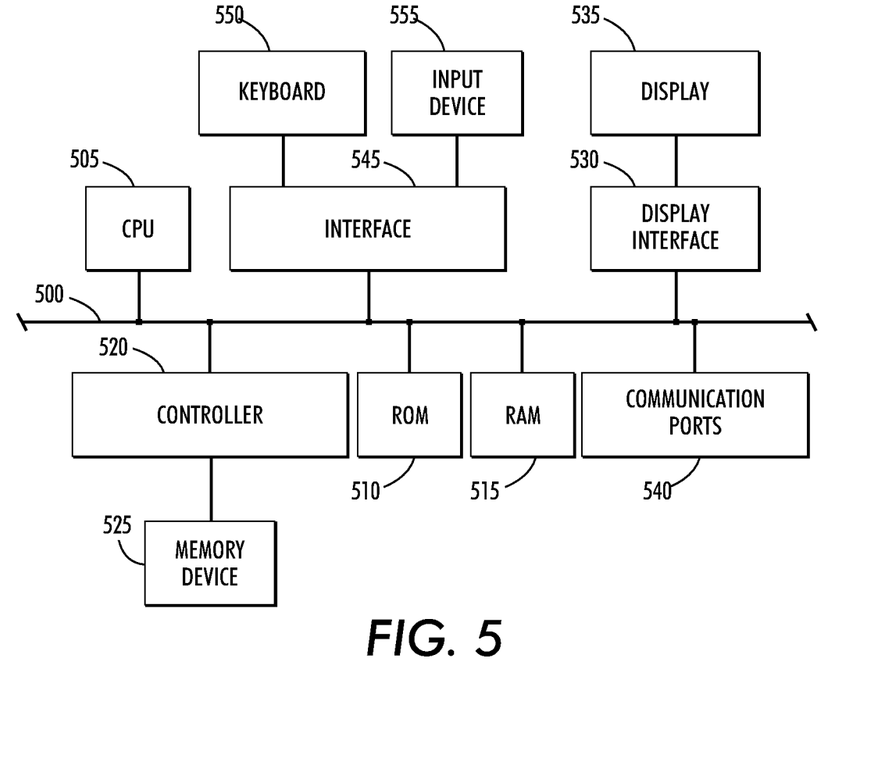
FIG. 5 depicts a block diagram of exemplary internal hardware that may be used to contain or implement program instructions according to an embodiment.

FIG. 5 depicts a block diagram of exemplary internal hardware that may be used to contain or implement program instructions, such as the process steps discussed above in reference to FIGS. 2 and 3, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 510 and random access memory (RAM) 515 constitute exemplary memory devices or processor-readable storage media.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. Communication with external devices, such as a print device, may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of processing a print job, the method comprising:

receiving a first print job by a cloud administration system from a raster image processing queue of one or more print devices located remotely from the cloud administration system, wherein the first print job is to be raster image processed;

storing the received first print job in a raster image processing storage module;

enabling a first application computing device to access the received first print job from the raster image processing storage module to perform raster image processing on the first print job, wherein the first application computing device is located remotely from the cloud administration system;

receiving a second print job from a scan queue of one or more of the print devices;

storing the received second print job in a scan processing module;

enabling a second application computing device to access the received second print job from the scan processing module, wherein the second application computing device is located remotely from the cloud administration system;

receiving a third print job from a hold queue of one or more of the print devices wherein the hold queue is configured to store one or more print jobs to be printed at a future time; and storing the received third print job in a backup storage module associated with the hold queue.

2. The method of claim 1, further comprising transmitting one or more of the first print job, the second print job and the third print job to one or more of the following:
   the associated print device;
   a second print device; and
   a remote computing device.

3. The method of claim 1, further comprising transmitting one or more of the first print job, the second print job and the third print job to one or more of the following:
   an inbound spooler of the associated print device; and
   an inbound spooler of a second print device.

4. The method of claim 1, wherein receiving a first print job comprises receiving the first print job from the raster image processing queue via a transmission module.

5. The method of claim 1, wherein receiving a second print job comprises receiving the second print job from the scan queue via a transmission module.

6. The method of claim 1, wherein receiving a third print job comprises receiving the third print job from the hold queue via a transmission module.

7. The method of claim 1, wherein receiving a third print job from a hold queue comprises receiving the third print job after completion of a time interval.

8. The method of claim 1, wherein receiving a third print job from a hold queue comprises receiving the third print job in response to the third print job being added to the hold queue.

9. The method of claim 1, wherein enabling a first application computing device to access the received first print job from the raster image processing storage module to perform raster image processing on the first print job comprises enabling the first application computing device to access the received first print job from the raster image processing storage module to perform one or more raster image processing operations on the first print job.

10. The method of claim 1, further comprising transmitting the first print job that has been raster image processed to one or more of the following:
   the associated print device;
   a second print device; and
   a remote computing device.

11. A system of processing a print job, the system comprising:
   one or more print devices;
   a cloud administration system located remotely from the print devices;
   a first application computing device located remotely from the cloud administration system;
   a second application computing device located remotely from the cloud administration system;
   a third application computing device located remotely from the cloud administration system,
   wherein the cloud administration system is configured to:
      receive a first print job from a raster image processing queue of one or more of the print devices, wherein the first print job is to be raster image processed,
      store the received first print job in a raster image processing storage module,
      enabling the first application computing device to access the received first print job from the raster image processing storage module to perform raster image processing on the first print job,
      receive a second print job from a scan queue of one or more of the print devices,
      store the received second print job in a scan processing module,
      enable a second application computing device to access the received second print job from the scan processing module,
      receive a third print job from a hold queue of one or more of the print devices
   wherein the hold queue is configured to store one or more print jobs to be printed at a future time, and
      store the received third print job in a backup storage module associated with the hold queue.

12. The system of claim 11, wherein the cloud administration system is further configured to transmit one or more of the first print job, the second print job and the third print job to one or more of the following:
   the associated print device;
   a second print device; and
   a remote computing device.

13. The system of claim 11, wherein the cloud administration system is further configured to transmit one or more of the first print job, the second print job and the third print job to one or more of the following:
   an inbound spooler of the associated print device; and
   an inbound spooler of a second print device.

14. The system of claim 11, wherein the cloud administration system is configured to receive the first print job from the raster image processing queue via a transmission module.

15. The system of claim 11, the cloud administration system is configured to receive the second print job from the scan queue via a transmission module.

16. The system of claim 11, wherein the cloud administration system is configured to receive the third print job from the hold queue via a transmission module.

17. The system of claim 11, wherein the cloud administration system is configured to receive the third print job after completion of a time interval.

18. The system of claim 11, wherein the cloud administration system is configured to receive the third print job in response to the third print job being added to the hold queue.

19. The system of claim 11, wherein the cloud administration system is configured to enable the first application computing device to access the received first print job from the raster image processing storage module to perform one or more raster image processing operations on the first print job.

20. The system of claim 11, wherein the cloud administration system is further configured to transmit the first print job that has been raster image processed to one or more of the following:
   the associated print device;
   a second print device; and
   a remote computing device.

* * * * *